United States Patent
Swanson

(10) Patent No.: US 12,335,028 B1
(45) Date of Patent: Jun. 17, 2025

(54) METHOD AND COMPUTER-READABLE MEDIUM FOR A CORRELATOR USING AN N-DIMENSIONAL ACCUMULATOR TO TEST $2^N$ ALIGNMENTS

(71) Applicant: The United States of America as represented by the Secretary of the Navy, San Diego, CA (US)

(72) Inventor: Paul David Swanson, Santee, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 37 days.

(21) Appl. No.: 18/544,075

(22) Filed: Dec. 18, 2023

(51) Int. Cl.
    H04J 13/00    (2011.01)
    H04B 1/707    (2011.01)

(52) U.S. Cl.
    CPC .......... H04J 13/0022 (2013.01); H04B 1/707 (2013.01)

(58) Field of Classification Search
    CPC ...... H04B 1/707; H04B 1/709; H04B 1/7163; H04J 2011/0006; H04J 13/0022; H04J 13/0025
    USPC ......... 375/140–142, 145, 149, 150; 370/335, 370/342
    See application file for complete search history.

(56) References Cited

U.S. PATENT DOCUMENTS

| | | | |
|---|---|---|---|
| 6,493,376 B1 * | 12/2002 | Harms | H04B 1/7075 375/E1.003 |
| 6,934,317 B1 * | 8/2005 | Dent | H04L 1/0003 375/147 |
| 7,460,667 B2 * | 12/2008 | Lee | G10L 19/018 704/E19.009 |
| 9,528,243 B1 * | 12/2016 | Schaffner | E02F 5/102 |
| 10,735,046 B1 | 8/2020 | Swanson | |
| 2019/0173518 A1 * | 6/2019 | Ataie | H04B 1/70754 |

* cited by examiner

*Primary Examiner* — Young T. Tse
(74) *Attorney, Agent, or Firm* — Naval Information Warfare Center Pacific; Kyle Eppele

(57) ABSTRACT

A method for correlating using an N-dimensional accumulator to test $2^N$ alignments. The method comprises transmitting a spread code comprising a data sequence and a pseudo-noise sequence; receiving, at a plurality of successive clock cycles, the spread code further comprising a plurality of alignments; assigning each of the plurality of alignments to an alignment vector comprising "N" dimensions; generating a binary representation of each of the plurality of alignments in the alignment vector, wherein 1 and −1 to depict the logic states 0 and 1 with the DS-CDMA signal that has been received by the receiver; accumulating a plurality of moving averages for each dimension of the N-dimensional alignment vector; determining an absolute value of each moving average; combining each of the plurality of moving averages with each corresponding alignment vectors; identifying when the sign of each dimension of the accumulation vector becomes stable; and determining the alignment vector.

8 Claims, 8 Drawing Sheets

METHOD AND COMPUTER-READABLE MEDIUM FOR A CORRELATOR USING AN N-DIMENSIONAL ACCUMULATOR TO TEST $2^N$ ALIGNMENTS

STATEMENT REGARDING FEDERALLY-SPONSORED RESEARCH AND DEVELOPMENT

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: niwc_patent.fct@us.navy.mil, referencing Navy Case No. 210,794.

BACKGROUND

The present disclosure generally relates to acquisition of direct sequence code division multiple access (DS-CDMA) transmission.

DS-CDMA is a spread-spectrum signaling technique in which a data sequence is used to modulate a wideband code. Noise-like spreading code, referred to as a pseudo-noise (PN) sequence, may be deterministically generated to align the transmission timing. PN sequences are generated by a pseudo-random noise generator, which may simply consist of or (XOR) gates and a shift register, and operates to create a periodic binary sequence with an autocorrelation that resembles, over a period, the autocorrelation of a random binary sequence. Longer spreading codes have the advantage of greater security and the possibility of more low cross correlation codes operating simultaneously. However longer codes also require more time to acquire. Receivers XOR a corresponding PN sequence to extract the data channel that was "spread" by the transmitter with the same spreading sequence. However this only works when the receiver spread code is in perfect alignment with identical spread code of the transmitter. Before a receiver can extract the channel of interest, it must first determine the timing of the beginning of the transmitted spread code. This is usually done by checking each possible alignment, i.e., checking each phase delay, until the correct start alignment produces the anticipated data. It is assumed the correct alignment will produce the most transmitted power at frequencies less than the "chip" rate of the transmission. Time at each possible alignment is required to integrate this power by integrator to see if it surpasses an arbitrary threshold. Eventually, after alignment is acquired, the decoded data is passed to downstream circuitry for further processing.

There exists a need for a system and method for quickly and efficiently identifying the transmitted spread code sequence offset alignment and offset time dependence, even in the presence of a Doppler shift.

SUMMARY

According to illustrative embodiments, a method of acquiring a direct sequence code division multiple access (DS-CDMA) signal, the method comprising transmitting a spread code comprising a data sequence and a pseudo-noise sequence; receiving, at a plurality of successive clock cycles, the spread code further comprising a plurality of alignments; assigning each of the plurality of alignments to an alignment vector comprising "N" dimensions; generating a binary representation of each of the plurality of alignments in the alignment vector, wherein 1 and −1 to depict the logic states 0 and 1 with the DS-CDMA signal that has been received by the receiver; accumulating a plurality of moving averages for each dimension of the N-dimensional alignment vector; determining an absolute value of each moving average; combining each of the plurality of moving averages with each corresponding alignment vectors, resulting in accumulation vector having "N" dimensions; identifying when the sign of each dimension of the accumulation vector becomes stable; and determining the alignment vector that aligns the receiver to the spread code.

Additionally, a non-transitory, tangible, computer-readable media having computer-readable instructions stored thereon, the computer-readable instructions being capable of being read by a computer and being capable of instructing the computer to perform a method of acquiring a direct sequence code division multiple access (DS-CDMA) signal, the method comprising: transmitting a spread code comprising a data sequence and a pseudo-noise sequence; receiving, at a plurality of successive clock cycles, the spread code further comprising a plurality of alignments; assigning each of the plurality of alignments to an alignment vector comprising "N" dimensions; generating a binary representation of each of the plurality of alignments in the alignment vector, wherein 1 and −1 to depict the logic states 0 and 1 with the DS-CDMA signal that has been received by the receiver; accumulating a plurality of moving averages for each dimension of the N-dimensional alignment vector; determining an absolute value of each moving average; combining each of the plurality of moving averages with each corresponding alignment vectors, resulting in accumulation vector having "N" dimensions; identifying when the sign of each dimension of the accumulation vector becomes stable; and determining the alignment vector that aligns the receiver to the spread code.

It is an object to provide a method and computer-readable medium for a correlator using an "N" dimensional accumulator to test $2^n$ alignments that offers numerous benefits, including improving the time it takes to identify and acquire the timing information of long spreading codes used in a Direct Sequence Code Division Multiple Access (DS-CDMA) transmission. Additionally, method and computer-readable medium for a correlator using an n-dimensional accumulator to test $2^n$ alignments provides a means of checking multiple signal/receiver spread code alignment checks that out performs conventional multiple scalar accumulators, which may be less "math" intensive than the previously the prior art.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings.

DETAILED DESCRIPTION OF EMBODIMENTS

The disclosed method and computer-readable medium below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other apparatus and method described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
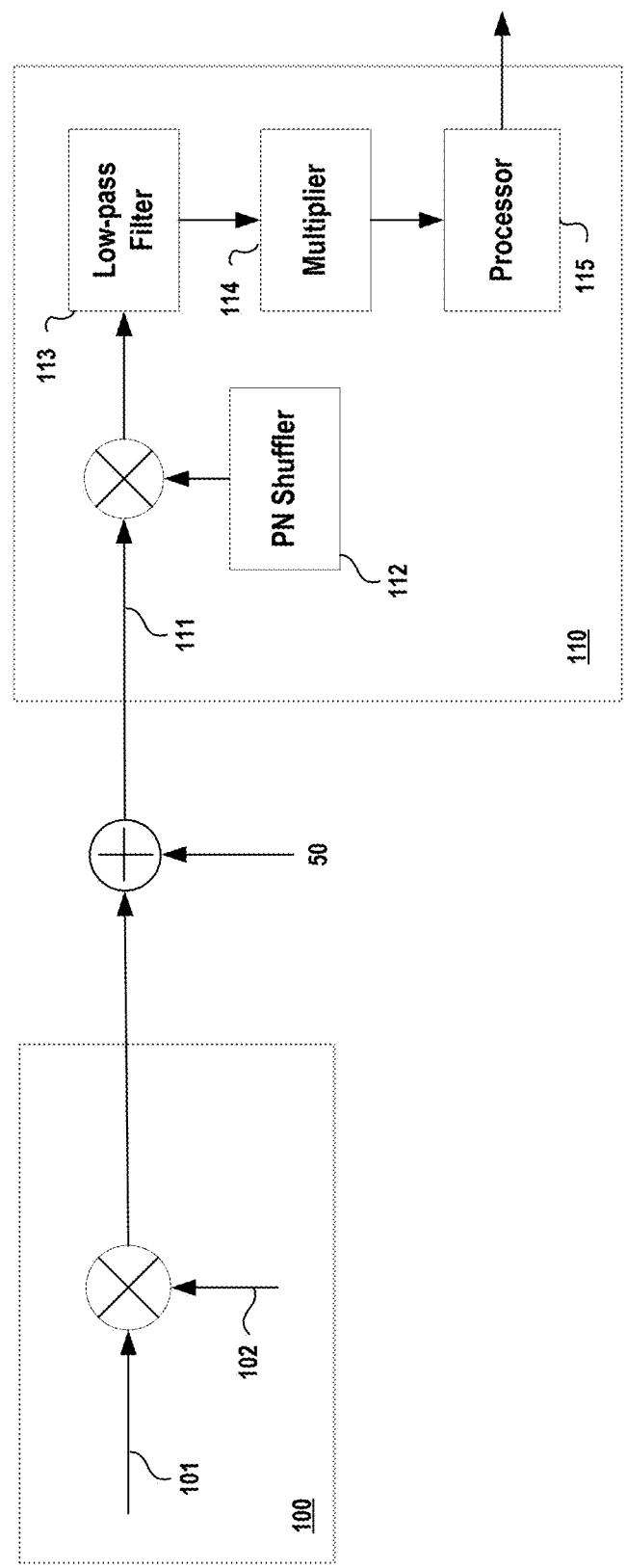
FIG. 1 illustrates a block-diagram of a DS-CDMA transmission system.

FIG. 1 illustrates a block-diagram of a DS-CDMA transmission system in accordance with aspects of the present disclosures. As shown in the figure, the DS-CDMA transmission system comprises a transmitter 100, noise 50, and a receiver 110. The transmitter further comprises a data sequence 101 and a PN sequence 102. The receiver 110 further comprises a spread code 111, a pseudo-noise (PN) shuffler 112, a multiplier 114, and a processor 115. Furthermore, the receiver 110 may further comprise a low pass filter 113 configured to reduce signal noise.

The PN shuffler 112 receives the spread code 111. As mentioned above, in a DS-CDMA system, a receiver 110 must check each possible alignment for acquisition. When summing the correlated values of the received signal with PN at one phase, the accumulated power will eventually increase, even if there is no alignment. While the accumulated power eventually increases over time, if the rise in power takes too long, then alignment is likely not present. Accordingly, when designing a DS-CDMA system, the power threshold $P_{th}$ and time threshold $t_{th}$ are set to weed out unlikely prospects for alignment. For example, function eventually reaches acceptable power threshold $P_{th}$, meaning that over time, sufficient pits of PN correlate with corresponding pits of the received signal, which has been offset by a predetermined phase, so as to generally increase the accumulated power. However, the rate of the rise of accumulated power of function is insufficient to meet $P_{th}$ prior to time threshold $t_{th}$. Accordingly, a new phase will be used and the process will repeat. This will continue until a phase will provide an accumulated power function that reaches acceptable power threshold $P_{th}$ prior to time threshold $t_{th}$ is represented by function. The problem with a DS-CDMA system is that many alignments may need to be tested, each of which until $t_{th}$ is reached, which wastes much time and processing resources.

The receiver 110 further comprises a PN Shuffler 112 and uses the PN 102, which is provided a priori. The PN sequence at the receiver acts as a "key" to the transmission. Traditionally, long spreading codes 111 are processed with competing scalar accumulators that must wait until the accumulator for the correct alignment rises above the noise based values of the competing accumulators. Previous methods also include determining if one of the shuffled alignments matches an alignment based on a magnitude and angle of the XY vector (alignment vector). However, the more directions can be created by increasing the number of dimensions of the accumulating vector. The calculation of the dominating alignment based on the vector direction can be greatly simplified and made more efficient by utilizing one dimension having 2 directions (+ or −).

A multiplier 203 is an element for multiplying or combine and may be operable to multiply the each of the alignments by 1 and −1 to depict the logic states 0 and 1 to generate a binary representation of each of the plurality of alignments with the DS-CDMA signal that has been received by the receiver. Thus $2^N$ alignments can be tested with an "N" dimensional alignment vector.

For each incoming chip value, the processor 115 may execute computer instructions to test for different alignment. For example, a chip value may be updated in a 10-dimensional accumulation vector X(1-10) to check for 1024 alignments. The number of alignments that may be simultaneously check is only limited by the capacity of the computing element. Accordingly, the alignment vector may be calculated simultaneously, instead of dividing the signal into segments. The alignment vector may be calculated using a combination of the alignment phase and an absolute value of the alignment spread code and signal. In some embodiments, the alignment spread code may be averaged over a period of time and be continuously updated with new incoming chip values. This calculation is greatly simplified, computationally, compared to existing techniques. Additionally, this method may find the correct alignment faster than just having a conventional correlators running in parallel, even in the presence of noise and data. This method may be performed a non-transitory, tangible, computer-readable media having computer-readable instructions stored thereon, the computer-readable instructions being capable of being read by a computer and being capable of instructing the computer to perform a method of acquiring a direct sequence code division multiple access (DS-CDMA) signal.

The processor 115 a processor configured to perform a method of acquiring a DS-CDMA signal, further comprising: assigning each of the plurality of alignments to an alignment vector comprising "N" dimensions; accumulating a plurality of moving averages for each dimension of the N-dimensional alignment vector; determining an absolute value of each moving average; combining each of the plurality of moving averages with each corresponding alignment vectors, resulting in accumulation vector having "N" dimensions; identifying when the sign of each dimension of the accumulation vector becomes stable; and determining the alignment vector that aligns the receiver to the spread code.

Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an application specific integrated circuit ("ASIC"). In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

The receiver 110 may further comprise a low pass filter 113 configured to reduce signal noise. The low pass filter maybe an absolute value component, in one embodiment. Furthermore, a low pass filter 205 may averages over a period of one half the length of a subsection. This eliminates random positive and negative pulses with shorter pulse widths than the time it takes to receive "k" bits.

Figure 2:
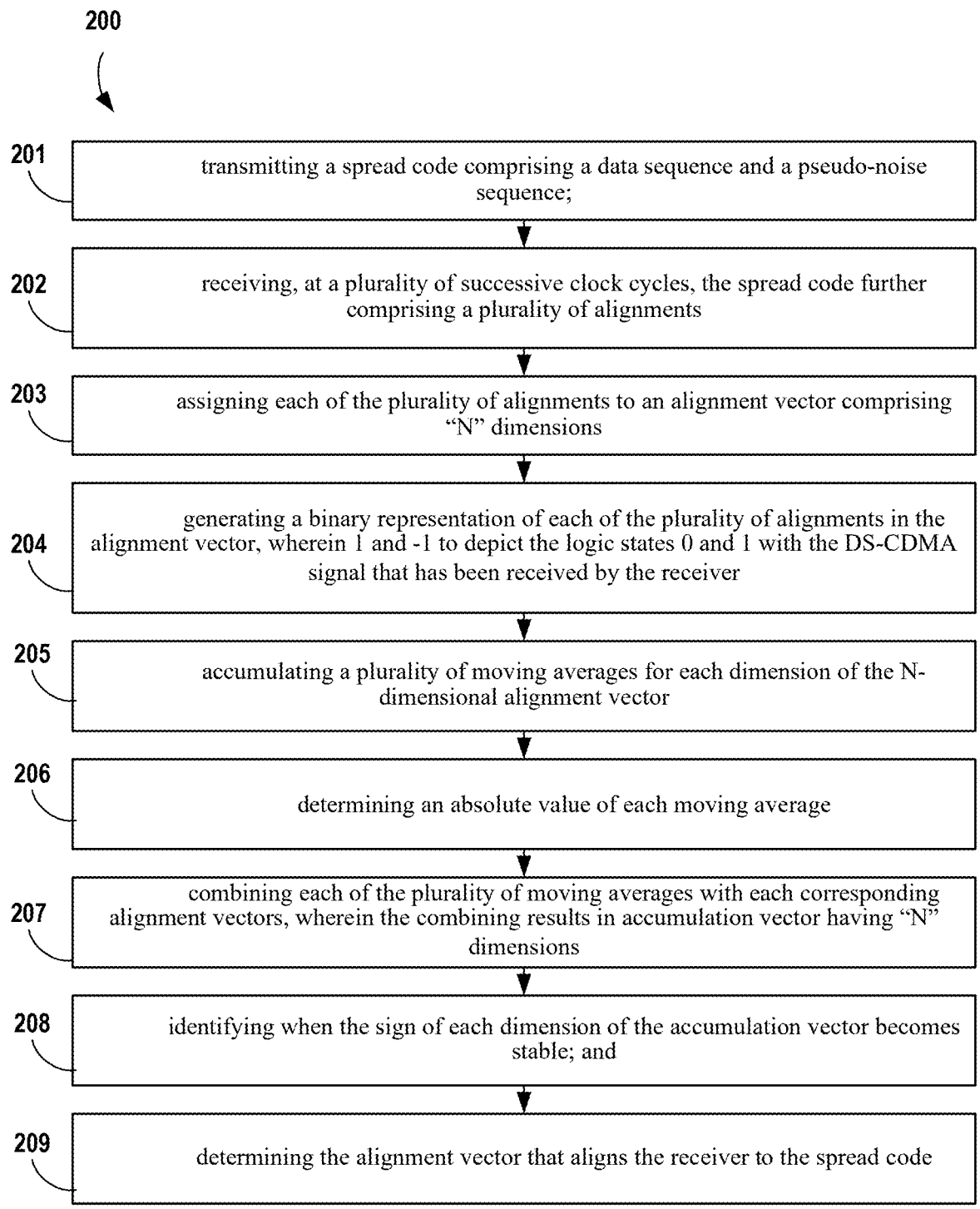
FIG. 2 shows a method of acquiring a direct sequence code division multiple access signal.

FIG. 2 shows a method of acquiring a direct sequence code division multiple access (DS-CDMA) signal 200, the method comprising transmitting a spread code comprising a data sequence and a pseudo-noise sequence 201; receiving, at a plurality of successive clock cycles, the spread code further comprising a plurality of alignments 202; assigning each of the plurality of alignments to an alignment vector comprising "N" dimensions 203; generating a binary representation of each of the plurality of alignments in the alignment vector, wherein 1 and −1 to depict the logic states 0 and 1 with the DS-CDMA signal that has been received by the receiver 204; accumulating a plurality of moving averages for each dimension of the N-dimensional alignment vector 205; determining an absolute value of each moving average 206; combining each of the plurality of moving averages with each corresponding alignment vectors, resulting in accumulation vector having "N" dimensions 207; identifying when the sign of each dimension of the accumulation vector becomes stable 208; and determining the alignment vector that aligns the receiver to the spread code 209.

The method of acquiring a DS-CDMA signal may further comprise wherein the moving average continuously updates with a new alignments at each clock cycle; wherein the plurality of alignments is $2^N$; and/or wherein the "N" dimensions are numbered from 0 to $2^N-1$.

Transmitting a spread code comprises a data sequence 101 and a pseudo-noise sequence 102 comprises transmitting from a transmitter 100, via DS-CDMA transmission, a spread code (i.e. chip values) to a receiver 110. The pseudo-noise sequence 111 is known to the receiver 110 and allows for correlation of the data sequence despite intervening noise. Noise 50 may be a consequence of environmental conditions and outside signals.

Receiving, at a plurality of successive clock cycles, the spread code further comprising a plurality of alignments 202 occurs at the receiver 110. The spread code 111 is first received by the receiver 200 and may be separated into section for alignment by a pseudo-noise shuffler 112. Furthermore, each clock cycle may provide more spread code and alignments.

The method 200 further includes assigning each of the plurality of alignments to an alignment vector comprising "N" dimensions 203. Accordingly, each spread code section may be associated with an alignment, wherein the number of alignments is represented as $2^N$. Each of the alignment are assigned a number from 0 to $2^N-1$ in an accumulation vector. The N-dimensional vector defining the accumulation vector direction of a given alignment (defined as the "alignment vector") is the binary representation of the alignment number. Accordingly, the spread code may have an associated "N" alignments that are each updated with each clock cycle.

Generating a binary representation of each of the plurality of alignments in the alignment vector, wherein 1 and −1 to depict the logic states 0 and 1 with the DS-CDMA signal that has been received by the receiver 204, comprises taking the bit values of the binary representations of the alignment number and replacing the bit value 0 with "1" and 1 with "−1". Existing methods of determining alignment utilize complex calculations of many directions, 32 or more in some instances, which results in significant computation time and resources. However, similar results are shown herein with the simplification of a one-dimension vector.

Accumulating a plurality of moving averages for each dimension of the N-dimensional alignment vector 205, involves aggregating of the moving averages from each alignment. In one embodiment, this is performed by an accumulator element or calculation module. Furthermore, this calculation may be a time-weighted average. For example, the moving average may be calculated by adding the current moving average to the difference between the new alignment and current average divided by the number of alignments averaged. Continuously calculating a moving average offers benefits, including saving memory by condensing the averaging/accumulating calculations. Accumulating the moving average enables trends in the moving average to stand out and identify alignment. The moving alignment is determined by accumulating the binary numbers to find the dominant alignment. Generally, random noise will produce alignment vectors that will cancel it out. However, a transmission will provide accumulation vectors that increasingly aggregate so as to make the alignment identifiable.

Next, the method 200 includes determining an absolute value of each moving average 206. The absolute value may help determine the magnitude of the moving average in a single direction. This, in one embodiment, may be performed with a low pass filter.

Furthermore, the method 200 includes combining each of the plurality of moving averages with each corresponding alignment vectors, resulting in accumulation vector having "N" dimensions 207, comprises multiplying each of the moving averages with the alignment vectors. In other words, the moving averages are combined with the binary representations (i.e. −1 or 1) of the vector. This combinations is an accumulation vector that may be arrived at with significantly less computing power than previous methods. The resulting accumulation vector may stabilize when a spread code is present so that a transmission alignment may be identified.

The method 200 further includes identifying when the sign of each dimension of the accumulation vector becomes stable 208. In the presence of a spread code with alignments, the accumulation vector will stabilize across its "N" dimensions. This will show as the accumulation vector reaching a maximum or peak relative value. Because noise tends to produce alignments that cancel out, the presence of a significant accumulation that has stabilized means that an alignment has been identified.

Determining the alignment vector that aligns the receiver to the spread code 209. As a result of significantly simplified computation, the correlation of the alignment vectors may be achieved more quickly and efficiently. Moreover, these calculations maybe performed simultaneously, instead of dividing the signal into segments for each alignments. After the alignment has been determined, the signal may be passed to other electrical circuitry.

In one embodiment, incoming spread values updated a 10 dimensional accumulation vector X(1-10) to test for 1024 different alignments. Exemplary code is included below to illustrate the method of acquiring a direct sequence code division multiple access (DS-CDMA) signal 400 and operable on a receiver for acquiring a direct sequence code division multiple access (DS-CDMA) signal. SR1, SR2 and PC1, PC2 are exemplary shift registers and exemplary feed polynomials for generating the spread code.

The following exemplary MATLAB code excerpt (below) provides a sample "Gold Code" that is example data sequence 101 for transmission.

```
Fb1=bitget(sum(int8(SR1&PC1)),1);
Fb2=bitget(sum(int8(SR2&PC2)),1);
SR1=circshift(SR1,1);
SR2=circshift(SR2,1);
SR1(1)=Fb1;
SR2(2)=Fb2;
GC(1)=int8(xor(SR1(1),SR2(1)))
GC=circshift(GC,1);
```

The next MATLAB code excerpt demonstrates the calculation of the moving average, wherein the "Gold Code" is continuously provides alignment values to a moving average (AA) by incorporating a new value (cS) into an accumulated moving average (AAA). This calculation may be performed by processor 204, in one embodiment.

```
AA=AA-AA./32+int16(GC.*(cS*32));
AAA=abs(AA);
ADD=ADD+double(AA);
ADA=abs(ADD);
[M,I]=max(abs(ADA));
I=I-17;
if mod(j,1000)==0
   disp(j)
end
%%%%%
LastIa=Ia;
[Ma,Ia]=max(abs(ADA));
Ia=Ia-17+(g-1)*1024;
if Ia<0
Ia=Ia+131071;
End
```

Ensuing from the previous MATLAB code excerpt, an array (X) comprising 10 elements (N=10) wherein the new moving average (AAA) is updating the corresponding bits in the X array. For example, X(1) updates the first bit, X(2) updates the second bit, and so on. When an alignment direction in the X array becomes consistent, then a final alignment direction may be correlated.

```
X(1) = X(1) + int32(sum(AAA.*Vct(1,:)))';
X(2) = X(2) + int32(sum(AAA.*Vct(2,:)))';
X(3) = X(3) + int32(sum(AAA.*Vct(3,:)))';
X(4) = X(4) + int32(sum(AAA.*Vct(4,:)))';
X(5) = X(5) + int32(sum(AAA.*Vct(5,:)))';
X(6) = X(6) + int32(sum(AAA.*Vct(6,:)))';
X(7) = X(7) + int32(sum(AAA.*Vct(7,:)))';
X(8) = X(8) + int32(sum(AAA.*Vct(8,:)))';
X(9) = X(9) + int32(sum(AAA.*Vct(9,:)))';
X(10) = X(10) + int32(sum(AAA.*Vct(10,:)))';
XsX = int8((1-sign(X))/2);
ALNX = sum(bitset(0,1:10,XsX,'int16'))-16;
```

Figure 3A:
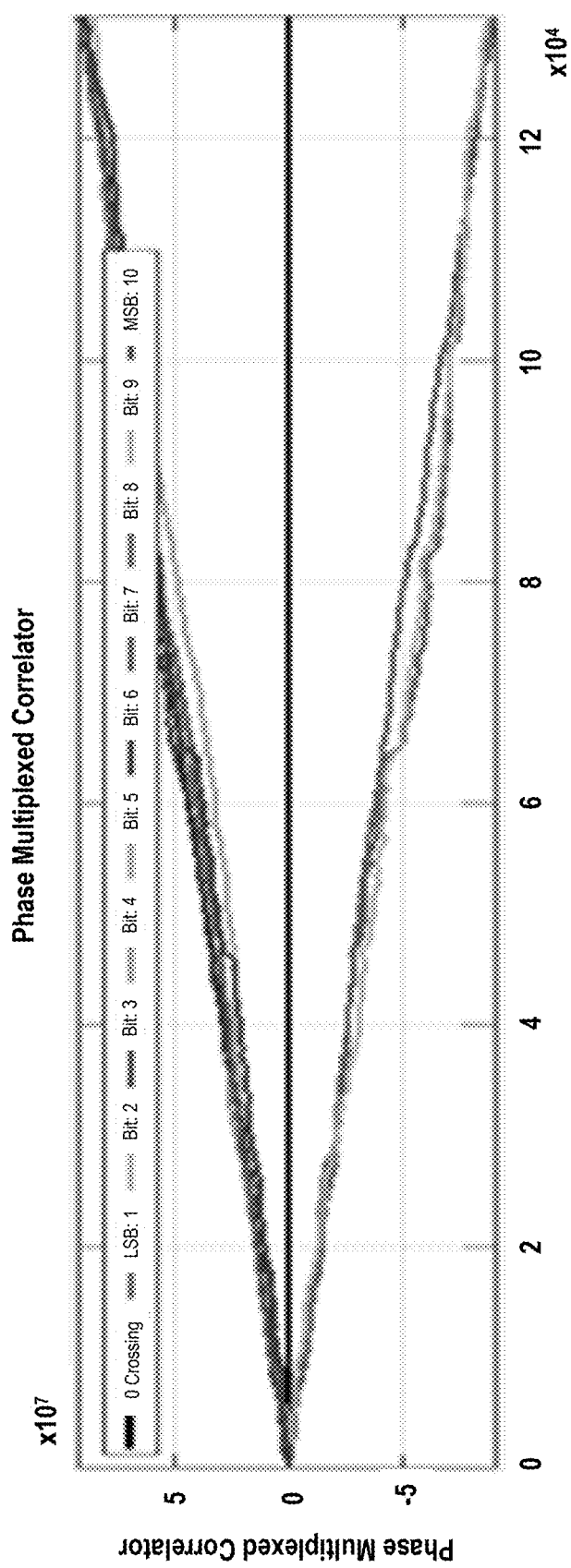
FIG. 3A shows exemplary results of running a method of acquiring a direct sequence code division multiple access signal.
Figure 3B:
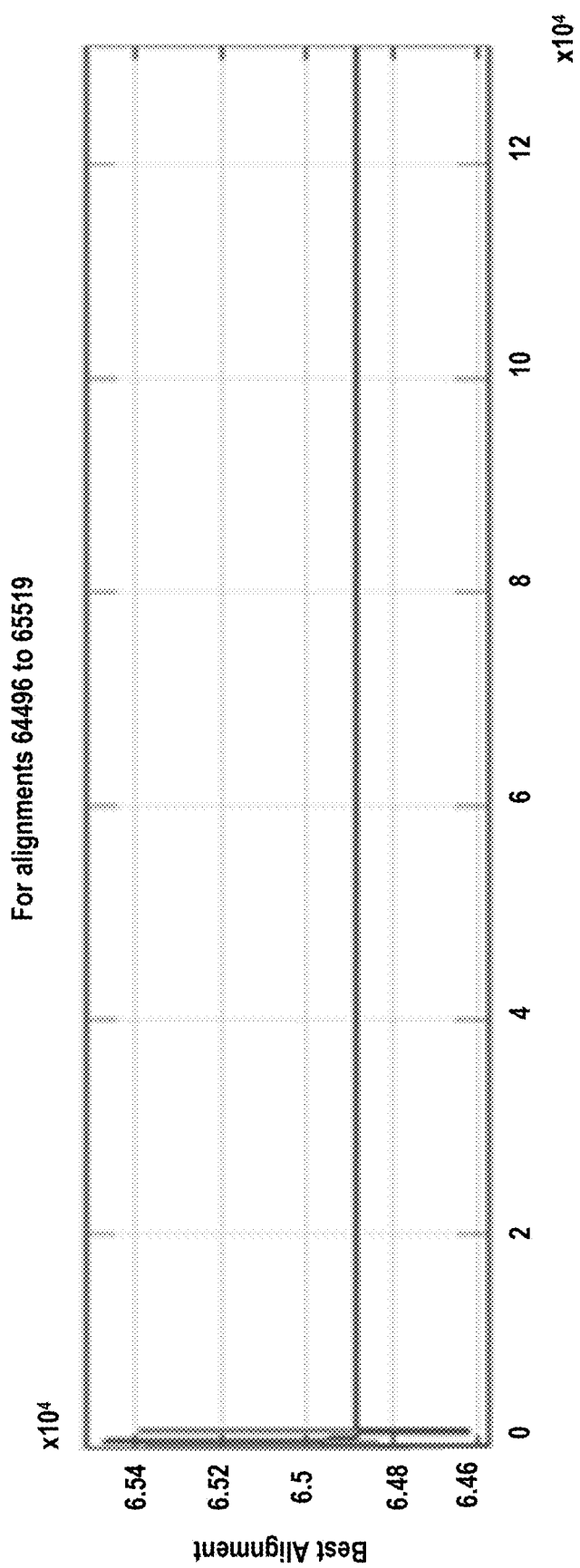
FIG. 3B shows exemplary results of running a method of acquiring a direct sequence code division multiple access signal for alignments between 64496 to 65519.
Figure 3C:
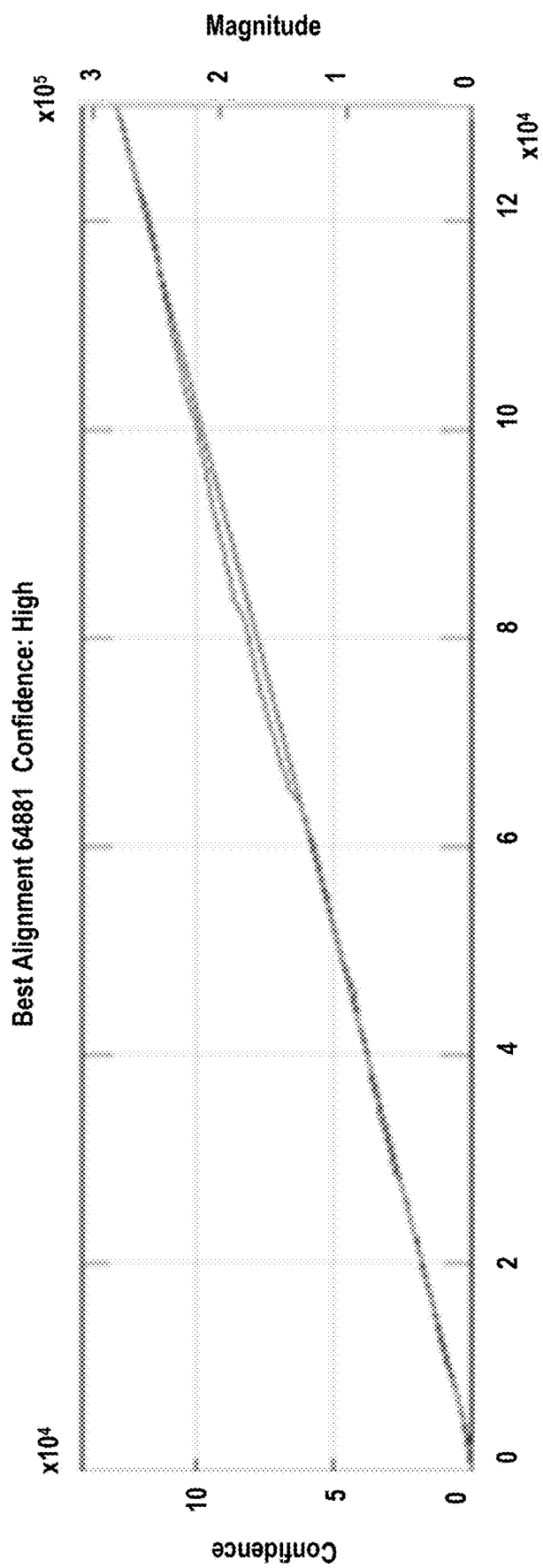
FIG. 3C show exemplary results of running a method of acquiring a direct sequence code division multiple access signal for the confidence level for the best alignment.

FIG. 3A, FIG. 3B, and FIG. 3C show exemplary results of running a method of acquiring a direct sequence code division multiple access (DS-CDMA) signal 400 and operable on a receiver for acquiring a direct sequence code division multiple access (DS-CDMA) signal. FIG. 3A shows a 10 dimension vector phase multiplexed correlator for a received signal that aligns with the 64881 step of a $17^{th}$ order spread sequence. FIG. 3B shows a best alignment for alignments 64496 to 65519, wherein the best alignment is rapidly determined as 64881. FIG. 3C shows an exemplary high level confidence for a best alignment of 64881 with a 10 dimension vector correlator.

Figure 4A:
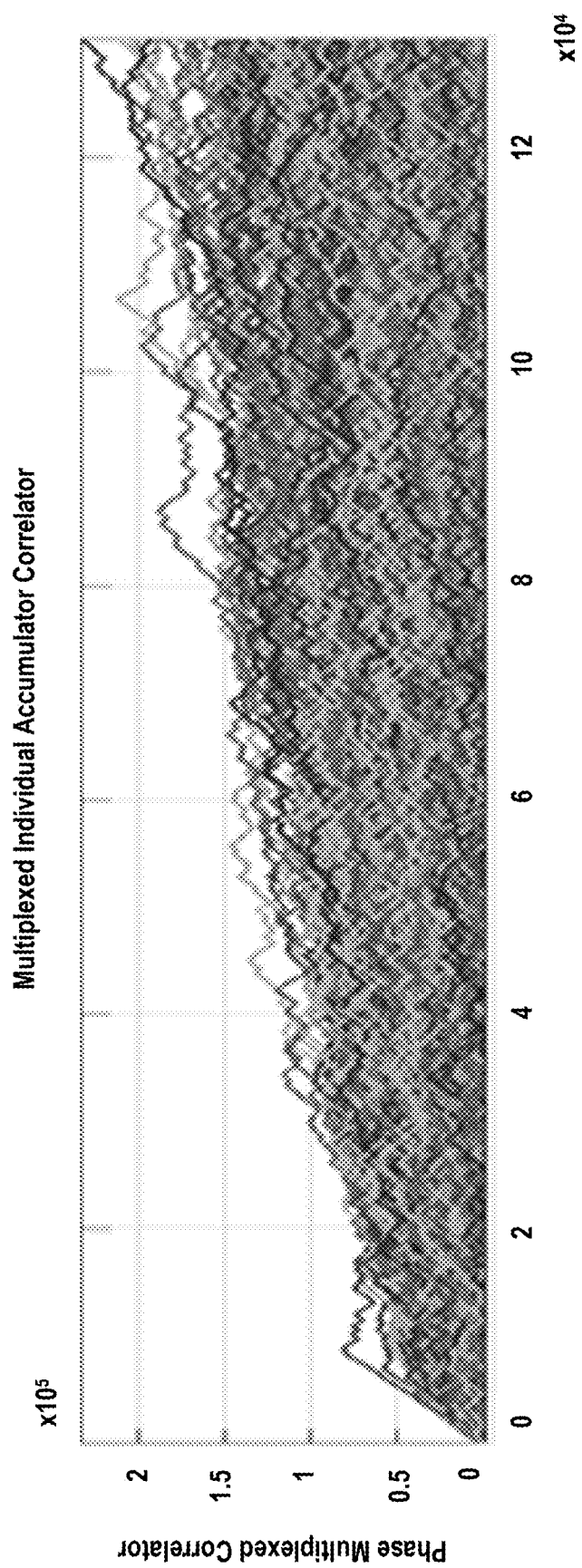
FIG. 4A shows exemplary results of running a 1024 parallel running conventional correlators.
Figure 4B:
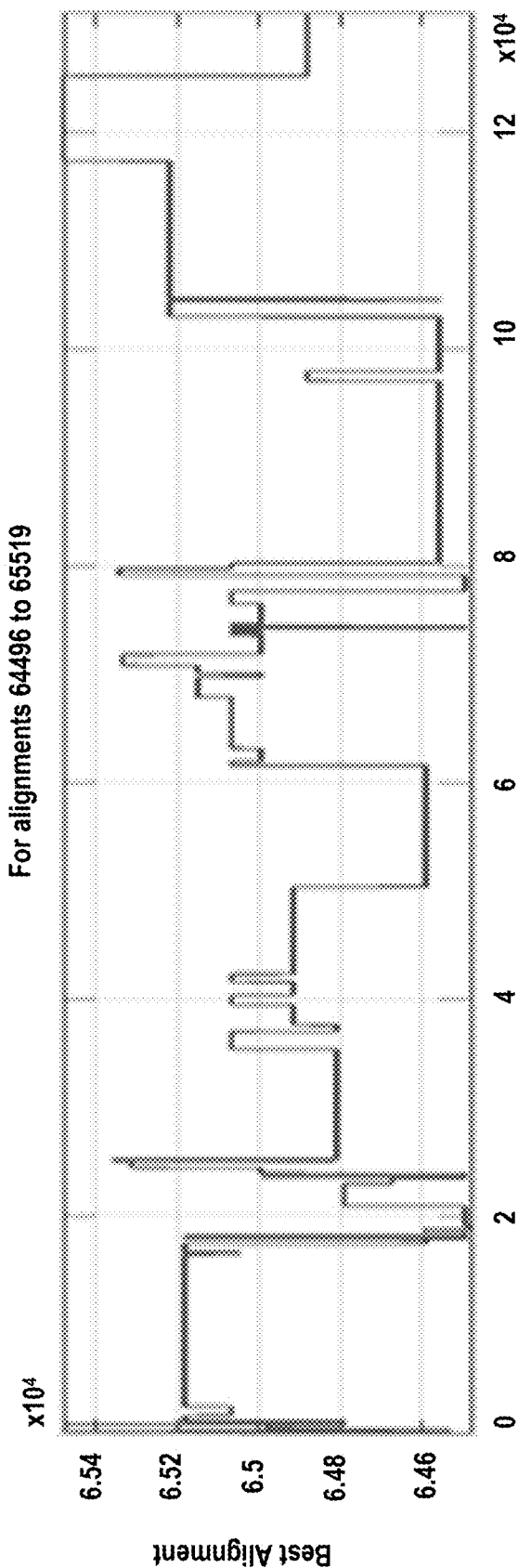
FIG. 4B shows exemplary results of running a 1024 parallel running conventional correlators for alignments between 64496 to 65519.
Figure 4C:
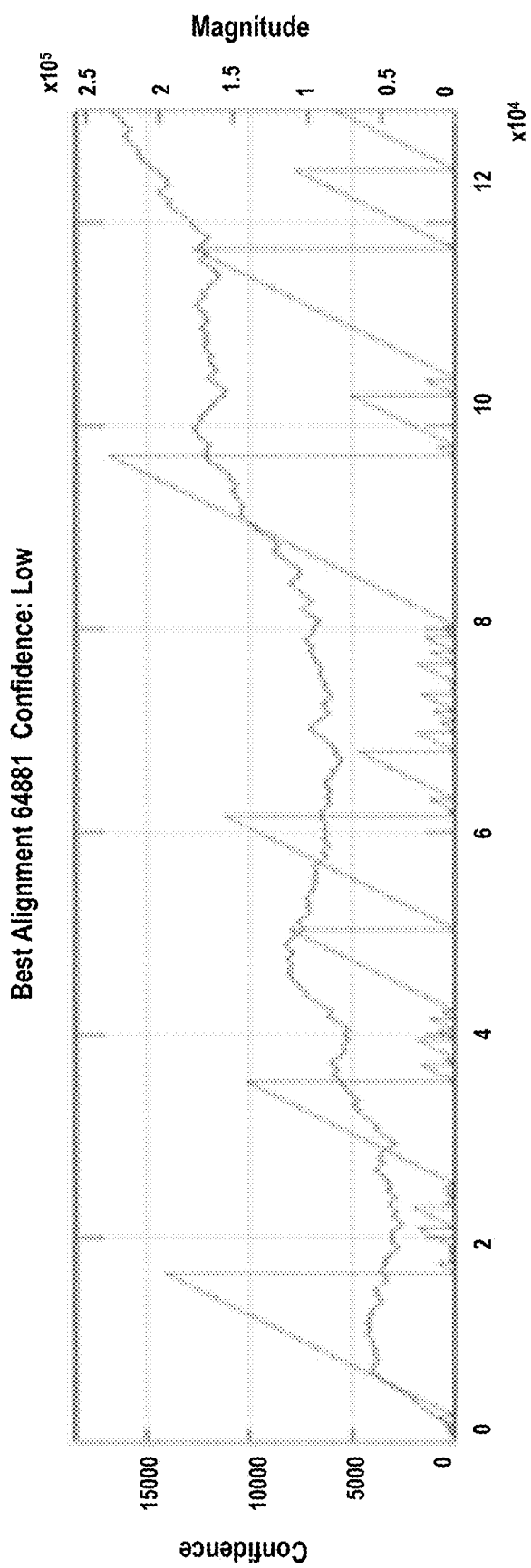
FIG. 4C shows exemplary results of running a 1024 parallel running conventional correlators for the confidence level for the best alignment.

FIG. 4A, FIG. 4B, and FIG. 4C show exemplary results of running a 1024 parallel running conventional correlators. FIG. 4A shows 1024 individual convention correlators wherein the magnitude of each vector is shown. FIG. 4B shows the best alignment for 1024 individual conventional correlators for determining an alignment from 64496 to 65519. FIG. 4C shows an exemplary low confidence for a best alignment of 64881 with 1024 individual conventional correlator.

From the above description of method and computer-readable medium for a correlator using an n-dimensional accumulator to test $2^n$ alignments, it is manifest that various techniques may be used for implementing the concepts of a receiver for acquiring a direct sequence code division multiple access (DS-CDMA) signal, A method of acquiring a direct sequence code division multiple access (DS-CDMA) signal, and a non-transitory, tangible, computer-readable media having computer-readable instructions stored thereon, the computer-readable instructions being capable of being read by a computer and being capable of instructing the computer to perform a method of acquiring a direct sequence code division multiple access (DS-CDMA) signal without departing from the scope of the claims. The described embodiments are to be considered in all respects as illustrative and not restrictive. The method/computer-readable medium disclosed herein may be practiced in the absence of any element that is not specifically claimed and/or disclosed herein. It should also be understood that a receiver for acquiring a direct sequence code division multiple access (DS-CDMA) signal, A method of acquiring a direct sequence code division multiple access (DS-CDMA) signal, and a non-transitory, tangible, computer-readable media having computer-readable instructions stored thereon, the computer-readable instructions being capable of being read by a computer and being capable of instructing the computer to perform a method of acquiring a direct sequence code division multiple access (DS-CDMA) signal are not limited to the particular embodiments described herein, but is capable of many embodiments without departing from the scope of the claims.

What is claimed:

1. A method of acquiring a direct sequence code division multiple access (DS-CDMA) signal, the method comprising:
    transmitting a spread code comprising a data sequence and a pseudo-noise sequence;
    receiving, at a plurality of successive clock cycles, the spread code further comprising a plurality of alignments;
    assigning each of the plurality of alignments to an alignment vector comprising N number of dimensions;
    generating a binary representation of each of the plurality of alignments in the alignment vector by 1 and −1 to depict logic states 0 and 1 with the DS-CDMA signal that has been received by a receiver;
    accumulating a plurality of moving averages for each dimension of N alignment vectors;
    determining an absolute value of each moving average;
    combining each of the plurality of moving averages with each of corresponding alignment vectors, resulting in an accumulation vector having the N number of dimensions;
    identifying when the sign of each dimension of the accumulation vector becomes stable; and
    determining the alignment vector that aligns the receiver to the spread code.

2. The method of acquiring the DS-CDMA signal of claim 1, wherein each of the plurality of moving averages continuously updates with a new alignment at each clock cycle.

3. The method of acquiring the DS-CDMA signal of claim 1, wherein the plurality of alignments is $2^N$.

4. The method of acquiring the DS-CDMA signal of claim 1, wherein the N number of dimensions is from 0 to $2^N-1$.

5. A non-transitory, tangible, computer-readable media having computer-readable instructions stored thereon, the computer-readable instructions being read by a processor and instructible the processor to perform a method of acquiring a direct sequence code division multiple access (DS-CDMA) signal, the method comprising:
    transmitting a spread code comprising a data sequence and a pseudo-noise sequence;
    receiving, at a plurality of successive clock cycles, the spread code further comprising a plurality of alignments;
    assigning each of the plurality of alignments to an alignment vector comprising N number of dimensions;
    generating a binary representation of each of the plurality of alignments in the alignment vector by 1 and −1 to depict logic states 0 and 1 with the DS-CDMA signal that has been received by a receiver;
    accumulating a plurality of moving averages for each dimension of N alignment vectors;
    determining an absolute value of each moving average;
    combining each of the plurality of moving averages with each of corresponding alignment vectors, resulting in an accumulation vector having the N number of dimensions;
    identifying when the sign of each dimension of the accumulation vector becomes stable; and
    determining the alignment vector that aligns the receiver to the spread code.

6. The non-transitory, tangible, computer-readable media having computer-readable instructions stored thereon, the computer-readable instructions being read by the processor and instructible the processor to perform the method of acquiring the DS-CDMA signal of claim 5, wherein each of the plurality of the moving averages continuously updates with a new alignment at each clock cycle.

7. The non-transitory, tangible, computer-readable media having computer-readable instructions stored thereon, the computer-readable instructions being read by the processor and instructible the processor to perform the method of acquiring the DS-CDMA signal of claim 5, wherein the plurality of alignments is $2^N$.

8. The non-transitory, tangible, computer-readable media having computer-readable instructions stored thereon, the computer-readable instructions being read by the processor and instructible the processor to perform the method of acquiring the DS-CDMA signal of claim 5, wherein the N number of dimensions is from 0 to $2^N-1$.

* * * * *